(12) United States Patent
Mori

(10) Patent No.: US 9,885,393 B2
(45) Date of Patent: Feb. 6, 2018

(54) SPRING FOR USE IN ONE-WAY CLUTCH AND ONE-WAY CLUTCH

(71) Applicant: NSK LTD., Tokyo (JP)

(72) Inventor: Hirofumi Mori, Kanagawa (JP)

(73) Assignee: NSK Ltd (JP)

( * ) Notice: Subject to any disclaimer, the term of this patent is extended or adjusted under 35 U.S.C. 154(b) by 78 days.

(21) Appl. No.: 14/899,749

(22) PCT Filed: Mar. 27, 2014

(86) PCT No.: PCT/JP2014/058942
§ 371 (c)(1),
(2) Date: Dec. 18, 2015

(87) PCT Pub. No.: WO2014/203583
PCT Pub. Date: Dec. 24, 2014

(65) Prior Publication Data
US 2016/0138663 A1    May 19, 2016

(30) Foreign Application Priority Data

Jun. 19, 2013  (JP) ................................ 2013-128159

(51) Int. Cl.
*F16D 41/067*    (2006.01)
*F16D 41/12*    (2006.01)
(Continued)

(52) U.S. Cl.
CPC ........... *F16D 41/067* (2013.01); *F16D 41/12* (2013.01); *F16F 1/18* (2013.01); *F16D 2041/0605* (2013.01)

(58) Field of Classification Search
CPC ........... F16D 41/12; F16D 41/067; F16F 1/18
See application file for complete search history.

(56) References Cited

U.S. PATENT DOCUMENTS 3,241,641 A    3/1966 Cowles
3,339,687 A    9/1967 Cowles
(Continued)

FOREIGN PATENT DOCUMENTS

EP    2 184 504    5/2010
FR    1 577 157    8/1969
(Continued)

OTHER PUBLICATIONS

Supplemental European Search Report dated Mar. 22, 2016.

*Primary Examiner* — Jacob S Scott
*Assistant Examiner* — Tinh Dang
(74) *Attorney, Agent, or Firm* — Hartman Global IP Law; Gary M. Hartman; Domenica N. S. Hartman

(57) ABSTRACT

A spring (11$b$) for a one-way clutch is provided that can suppress skewing of rollers and can restrain to a low level the stress generated due to bending of elastic pressure sections (23$b$1, 23$b$2). The spring (11$b$) is formed by subjecting an elastic metal plate to a bending process and comprises: a base section (22$b$) comprising a flat base-plate section (25); and a pair of elastic pressure sections (23$b$1, 23$b$2) formed by bending to an acute angle the both ends in the length direction of the base-plate section (25) towards the one side in the thickness direction of the base-plate section (25); and a pair of elbow sections (24$a$) located on the portions connecting the elastic pressure sections (23$b$1, 23$b$2) and the base-plate section (25). In particular, the elastic pressure sections (23$b$1, 23$b$2) cross each other in the middle sections in the length direction thereof.

5 Claims, 12 Drawing Sheets

(51) Int. Cl.
  *F16F 1/18* (2006.01)
  *F16D 41/06* (2006.01)

(56) References Cited

U.S. PATENT DOCUMENTS

| | | | | |
|---|---|---|---|---|
| 3,500,977 | A | * | 3/1970 | Gehrke ................ F16D 41/067 |
| | | | | 192/45.015 |
| 3,972,573 | A | * | 8/1976 | Marola ................ F16D 41/067 |
| | | | | 192/45.008 |
| 5,190,713 | A | | 3/1993 | Rabe |
| 5,593,294 | A | * | 1/1997 | Houghtby ............... F04C 28/28 |
| | | | | 188/82.6 |
| 5,617,937 | A | * | 4/1997 | Zettner ................ F16D 41/067 |
| | | | | 188/82.84 |
| 6,957,728 | B2 | * | 10/2005 | Aida .................... F16D 41/064 |
| | | | | 192/110 B |
| 7,370,741 | B2 | * | 5/2008 | Shimomura .......... F02N 15/023 |
| | | | | 192/110 B |
| 8,157,069 | B2 | * | 4/2012 | Altmann ............... F16D 41/067 |
| | | | | 192/45.004 |
| 2007/0119676 | A1 | | 5/2007 | Altmann |

FOREIGN PATENT DOCUMENTS

| | | |
|---|---|---|
| JP | 07-317809 | 12/1995 |
| JP | 09-296837 | 11/1997 |
| JP | 11063170 | 3/1999 |
| JP | 11093984 | 4/1999 |
| JP | 2000-074099 | 3/2000 |
| JP | 2001-234950 | 8/2001 |
| JP | 2002130433 | 9/2002 |
| JP | 2005003059 | 6/2005 |
| JP | 2006-009989 | 1/2006 |
| JP | 07072585 | 3/2007 |
| JP | 2007198582 | 8/2007 |

* cited by examiner

SPRING FOR USE IN ONE-WAY CLUTCH AND ONE-WAY CLUTCH

TECHNICAL FIELD

The present invention relates to a one-way clutch and a spring for use in a one-way clutch that are assembled in a pulley apparatus for rotating and driving an auxiliary machine such as an alternator of an automobile, or in an auxiliary drive apparatus that is used during an idling stop of an engine.

BACKGROUND ART

As a kind of a one-way clutch that is assembled in a pulley apparatus for driving an auxiliary machine for an automobile, such as an alternator or starter motor, there is a roller clutch. A pulley apparatus that is equipped with a roller clutch in which this kind of roller clutch is assembled has been known such as disclosed in JPH07072585 (B), JPH11063170 (A), JP2002130433 (A), JP2005003059 (A), and JP2007198582 (A). FIG. 12 to FIG. 14 illustrate an example of a conventional pulley apparatus that is equipped with a roller clutch. The pulley apparatus 1 equipped with a roller clutch has a sleeve 2 that can be fitted around and fastened to the rotating shaft of an alternator. A follower pulley 3 is arranged around this sleeve 2 and is concentric with the sleeve 2. There is a pair of support bearings 4 and a roller clutch 5 located between the outer-circumferential surface of the sleeve 2 and the inner-circumferential surface of the follower pulley 3.

The sleeve 2 is formed into an overall cylindrical shape, is fastened around the end of the rotating shaft of the alternator, and rotates together with this rotating shaft. Moreover, a large-diameter section 6 having a larger outer-diameter dimension than both end sections of the sleeve 2 is provided in the center section of the outer-circumferential surface of the sleeve 2. On the other hand, the cross-sectional shape in the width direction of the outer-circumferential surface of the follower pulley 3 is a wave shape so that part of a continuous belt called a poly V belt can pass around the pulley 3. A roller clutch 5 is located in the middle section in the axial direction of a space located between the outer-circumferential surface of the sleeve 2 and inner-circumferential surface of the follower pulley 3, and a pair of support bearings 4 are located on both end sections in the axial direction of this space and on both sides in the axial direction of the roller clutch 5. The pair of support bearings 4 allow relative rotation between the follower pulley 3 and sleeve 2, while supporting radial loads that are applied to the follower pulley 3. In the example illustrated in the figures, a deep-groove ball bearing is employed for both of the support bearings 4.

The roller clutch 5 allows to transmit torque between the follower pulley 3 and sleeve 2 only when there is a tendency for the follower pulley 3 to rotate in a specified direction with respect to the sleeve 2. The roller clutch 5 has a clutch inner ring 7, a clutch outer ring 8, plural rollers 9, a retainer 10, and plural springs 11.

The clutch inner ring 7 and clutch outer ring 8 are each formed into an overall cylindrical shape using a plate member made of hard metal such as bearing steel or the like, or of carburized steel such as SCM415 or the like. The clutch inner ring 7 is fitted around and fastened to the outer-circumferential surface of the large-diameter section 6 of the sleeve 2 by an interference fit, and the clutch outer ring 8 is fitted around and fastened to the inner-circumferential surface of the middle section of the follower pulley 3 by an interference fit. Moreover, at least the middle section in the axial direction of the inner-circumferential surface of the clutch outer ring 8 that comes in contact with each of the rollers 9 is a cylindrical surface 12. On the other hand, by forming plural concave sections 14 called ramp sections on the outer-circumferential surface of the clutch inner ring 7 so as to be uniformly spaced in the circumferential direction, the outer-circumferential surface of the clutch inner ring 7 becomes a cam surface 13.

The retainer 10, plural rollers 9 and plural springs are arranged in the cylindrical space between the cylindrical surface 12 and cam surface 13. The retainer 10 is integrally formed into a cage-like cylindrical shape by a synthetic resin such as polyamide 46, and has a pair of ring-shaped rim sections 15 respectively having an annular shape and plural column sections 16 that are uniformly arranged in the circumferential direction of the retainer 10 and connect the portions near the inner-circumferential edge of the inside surfaces of the rim sections 15. Plural protruding pieces 17 that are formed on the inner-circumferential surfaces of the rim sections 15 engage with the plural concave sections 14 of the cam surface 13, which makes it impossible for the retainer 10 to rotate relative to the clutch inner ring 7.

A pair of rear support plate sections 18 that are continuous with the inside surfaces of each of the rim sections 15, and that protrude outward in the radial direction from the outer circumferential surface of each of the column sections 16 are formed on both end sections in the axial direction of the middle section in the circumferential direction of each of the column sections 16. A front support plate section 19 that protrudes outward in the radial direction from the outer-circumferential surface of each column section 16 is formed in the center section in the axial direction of the portion a little further near the front in the circumferential direction (left in FIG. 13 and FIG. 14) than the rear support plate sections 18 of the column sections 16. Pockets 21 are provided in the portions surrounded on four sides by the pair of rim sections 15 and a set of two column sections 16 that are adjacent in the circumferential direction, and the rollers 9 are arranged in these pockets so as to be able to roll, and to move a little in the circumferential direction.

On the other hand, springs 11 for pressing the rollers 9 in the forward direction in the circumferential direction (left direction in FIG. 13) toward the shallow side of the concave sections 14 are provided at plural locations in the circumferential direction of the retainer 10 between the retainer 10 and the rollers 9. The springs 11 are obtained by performing a bending process on stainless steel plate (elastic metal plate) such as SUS304. The springs 11, as illustrated in FIG. 14 have an overall C shape along three sides of a trapezoid, and respectively have a flat plate shaped base section 22, a pair of elastic pressure sections 23 that are formed by bending the portions on both sides in the length direction of the base section 22 at acute angles ($\theta_1$) to one side in the thickness direction (left side in FIG. 14) of the base section 22, and a pair of elbow sections 24 that are provided in the continuous sections between the pair of elastic pressure sections 23 and the base section 22. The base section 22 has the function of securing the spring 11 to the retainer 10, the elastic pressure sections 23 have the function of elastically pressing the roller 9 by the tip-end sections, and the elbow sections 24 have a function of allowing the elastic pressure sections 23 to elastically bend with respect to the base section 22.

Each of the springs 11 is secured to the retainer 10 by bringing the front side surface of the base section 22 (left side surface in FIG. 13 and FIG. 14) in elastic contact with the rear side surface (right side surface in FIG. 13 and FIG. 14) of the support plate section 19, and bringing both end sections of the rear side surface (right side surface in FIG. 13 and FIG. 14) of the base section 22 in elastic contact with the front side surface (left side surface in the FIG. 13 and FIG. 14) of the pair of rear support plate sections 18. Moreover, in this state, protruding sections 20 are arranged on the inner side of the pair of elbow sections 24 that exist between the base section 22 and pair of elastic pressure sections 23 of the springs 11.

With the springs 11 secured to the retainer 10, the tip-end sections of the pair of elastic pressure sections 23 come in elastic contact with the rolling surfaces (outer-circumferential surfaces) of the rollers 9. The rollers 9 are elastically pressed by the elastic pressure sections 23 forward in the circumferential direction toward the portion of the cylindrical space between the cylindrical surface 12 and cam surface 13 having a narrow width in the radial direction. As a result, during operation, switching between the locked state and the overrun state of the roller clutch 5 is performed quickly.

In the pulley apparatus 1 equipped with a roller clutch, when the follower pulley 3, around the inside of which the clutch outer ring 8 is fitted and fastened, rotates with respect to the sleeve 2, around which the outside of which the clutch inner ring 7 is fitted and fastened, in the same direction that the springs 11 press the rollers 9 (forward direction in the circumferential direction), a force acts on the rollers 9 from the cylindrical surface 12 and cam surface 13 in the same direction as the pressure direction. As a result, the rollers 9 move toward the portions of the cylindrical space where the width in the radial direction is narrow, and are driven into these portions in a wedge shape. As a result, a state occurs in which torque can be transmitted between the sleeve 2 and the follower pulley 3 (locked state), and the sleeve 2 and follower pulley 3 rotate in synchronization.

On the other hand, when the follower pulley 3 rotates in the opposite direction of the pressure direction (toward the rear in the circumferential direction), a force in the opposite direction of the pressure direction acts on the rollers 9 from the cylindrical surface 12. As a result, there is a tendency for the rollers 9 to move toward the portions of the cylindrical space where the width in the radial direction is wide. When this occurs, the rollers 9 causes the elastic pressure sections 23 of the springs 11 to bend. The rollers 9 that move toward the portions having the wide width are able to freely roll and move a little in this portion. As a result, a state occurs in which torque is unable to be transmitted between the sleeve 2 and follower pulley 3.

The pulley apparatus 1 equipped with a roller clutch is such that the sleeve 2 is fitted around and fastened to the end section of the rotating shaft of an auxiliary machine such as an alternator, and a continuous belt is placed around the outer-circumferential surface of the follower pulley 3. This continuous belt extends around a drive pulley that is fastened to the end section of the crankshaft or the like of an engine, and is driven by the rotation of the drive pulley. When the operating speed of the continuous belt is constant or increasing, the roller clutch 5 is connected and set to the locked state, and torque can be transmitted to the rotating shaft from the follower pulley 3. On the other hand, when the operating speed of the continuous belt is decreasing, the connection of the roller clutch 5 is released and set to the overrun state, in which the follower pulley 3 freely rotates relative to the rotating shaft. As a result, even when the rotational angular velocity of the crankshaft changes, a decrease in life of the continuous belt due to wear and the occurrence of abnormal noise called squealing are prevented, and a decrease in the generating efficiency of the alternator is also prevented.

In the roller clutch 5, the circumferential surface 12 and the cam surface 13 that come in contact with the rollers 9 may be formed directly on the inner-circumferential surface of the follower pulley 3 and the outer-circumferential surface of the sleeve 2. Moreover, as illustrated in FIG. 15, the arrangement in the radial direction of the cylindrical surface 12 and cam surface 13 may also be opposite from that described above. In other words, in a case in which operation in the overrun state is performed a lot of the time, and the amount of time in which operation is performed in the locked state is much shorter when compared with the overall operating time such as when assembled on the end section of a drive shaft of a starter motor or the like, preferably the cam surface 13 is formed on the inner-circumferential surface of the clutch outer ring 8a, and the cylindrical surface 12 is formed on the outer-circumferential surface of the clutch inner ring 7a. When the arrangement in the radial direction of the cylindrical surface 12 and the cam surface 13 is opposite in this way, the centrifugal force that occurs when rotating in the overrun state moves the rollers 9 back into the concave sections 14, and makes it possible to easily prevent rubbing between the rolling surfaces of the rollers 9 and the cylindrical surface 12.

However, in the case of this first example of roller clutch 5 having conventional construction, from the aspect of preventing the rollers 9 from becoming skewed, and keeping stress that occurs in the springs 11 low, there is still room for improvement. In other words, as illustrated in FIG. 16, the pair of elastic pressure sections 23 of the spring 11 are provided so as to extend in directions closer to each other toward the tip-end sections over the entire length thereof. Therefore, the space between the pair of elastic pressure sections 23 becomes the shortest between the tip-end sections that come in contact with the roller 9. In other words, the distance $X_1$ between the force points of the elastic pressure sections 23 becomes short, and the tip-end sections of the elastic pressure sections 23 come in contact with the portions of the rolling surface of the roller 9 that are comparatively close to the center section in the axial direction, so it is easy for the roller 9 to become skewed due to the pressure force of the elastic pressure sections 23. Moreover, it is difficult to keep the overall length of the elastic pressure sections 23 long, so the distance $Y_1$ (distance in the direction that is orthogonal to the direction of the line of action of force from the roller 9) from the force point $A_1$ at the tip-end section of the elastic pressure sections 23 where a force from the roller 9 acts to the fulcrum point $B_1$ (area of contact between the front-side surfaces of the end sections of a pair of rear support plate sections 18 and the rear-side surfaces of both end sections of the base section 22) that is the portion that supports force acting on the elastic pressure sections 23 becomes short. Therefore, the amount of bending (bending angle) of the elastic pressure sections 23 becomes large, and it becomes easy for the stress that occurs in the elbow sections 24 to become high.

On the other hand, JPH11093984 discloses construction of a spring in which the distance between the force points can be made large. FIG. 17 and FIG. 18 illustrate another example of a roller clutch 5a that has this kind of spring. In this construction, the spring 11a of the roller clutch 5a is obtained by bending stainless steel plate into an arc shape. The center section in the lengthwise direction of the spring 11a is taken to be the base section 22a, and the remaining portions except for the base section 22a (center section) are taken to be a pair of elastic pressure sections 23a. The base section 22a comes in contact with the side surface in the circumferential direction of the column sections 16a of the retainer 10a, and the tip-end sections of the elastic pressure sections 23a coming in elastic contact with the rolling surface of the roller 9.

With this construction, as illustrated in FIG. 18, the elastic pressure sections 23a extend in a direction going away from each other from the base section 22a toward the tip-end sections. Therefore, the distance $X_2$ between force points, which is the space between the tip-end sections 23a of the elastic pressure sections 23a, can be made sufficiently large when compared with the construction illustrated in FIG. 16 ($X_2 > X_1$). Therefore, it becomes possible for the tip-end sections of the elastic pressure sections 23a to press the portions near both ends in the axial direction of the rolling surface of the roller 9, and thus it is possible to keep the roller 9 from becoming skewed. However, in this construction as well, the distance $Y_2$ from the force point $A_2$, which is the tip-end section of the elastic pressure sections 23a, 23a, to the fulcrum point $B_2$ (base section 22a) that supports the force acting on the elastic pressure sections 23a is not sufficiently long. Therefore, the problems of the amount of bending of the elastic pressure sections 23a becoming large, and the stress that occurs in the base end sections of the elastic pressure sections 23a becoming high are not eliminated.

RELATED LITERATURE

Patent Literature

[Patent Literature 1] JPH07072585 (B)
[Patent Literature 2] JPH11063170 (A)
[Patent Literature 3] JP2002130433 (A)
[Patent Literature 4] JP2005003059 (A)
[Patent Literature 5] JP2007198582 (A)
[Patent Literature 6] JPH11093984 (A)

SUMMARY OF INVENTION

Problem to be Solved by Invention

Taking the situation described above into consideration, it is the object of the present invention to provide a spring for a one-way clutch that is able to keep the locking members from becoming skewed, as well as keep the stress that occurs due to bending of the elastic pressure sections low.

Means for Solving Problems

The springs for a one-way clutch of the one-way clutch of the present invention has:
a base section having a flat shaped base-plate section that is made of a metal sheet having elasticity, and comprising a function of securing the spring to a retainer of the one-way clutch;
a pair of elastic pressure sections formed by bending portions on both sides in the lengthwise direction of the base-plate section at an acute angle to one side in the thickness direction of the base-plate section, with each having a tip-end section that elastically comes in contact with a locking member that is held in the retainer, and comprising a function of pressing the locking member; and
a pair of elbow sections provided in the continuous sections between the pair of elastic pressure sections and the base-plate section, and comprising a function of allowing the elastic pressure sections to elastically bend with respect to the base-plate section.

Particularly, the spring for a one-way clutch of the present invention is such that the pair of elastic pressure sections cross each other in the middle sections in the lengthwise direction thereof (preferably, the center section in the lengthwise direction in the free state), and the pair of elastic pressure sections extend so that the tip-end sections are located near both end sections in the lengthwise direction of the spring.

Each of the tip-end sections of the pair of elastic pressure sections is bent so that the surface that is on the opposite side from the surface that faces the base-plate section (surface that faces the locking member) is a convex surface, for example, preferably is curved in a circular arc shape.

Moreover, preferably a U-shaped holding section for attaching the base section to a column section of the retainer is provided in the portion of the base section on the other side in the thickness direction of the base-plate section so as to be continuous with the middle section in the lengthwise direction of the base-plate section. Furthermore, a stopper extending toward the other side in the thickness direction of the base-plate section and for preventing the locking member from falling out from the retainer is provided on part of the holding section.

The one-way clutch of the present invention in which the springs for a one-way clutch of the present invention are assembled, has: a member corresponding to an inner ring; a member corresponding to an outer ring that is arranged around the member corresponding to the inner ring, and is concentric with the member corresponding to the inner ring; plural locking members (rollers, or engaging elements such as sprags, cams or the like) that are provided between the outer-circumferential surface of the member corresponding to the inner ring, and the inner-circumferential surface of the member corresponding to the outer ring; a retainer that holds the locking members; and the springs for a one-way clutch of the present invention that are secured to the retainer and press the locking members in a direction so as to engage with both the outer-circumferential surface of the member corresponding to the inner ring, and the inner-circumferential surface of the member corresponding to the outer ring; and the one-way clutch allowing the locking members to engage with the outer-circumferential surface of the member corresponding to the inner ring, and the inner-circumferential surface of the member corresponding to the outer ring so as to transmit torque therebetween only when there is a tendency for relative rotation in a specified direction between the member corresponding to the inner ring and the member corresponding to the outer ring. In a preferred form, each of the springs for a one-way clutch of the present invention has the holding section, and the holding section fits with the middle section in the axial direction of a column section of the retainer. Moreover, in a preferred form, each of the springs for a one-way clutch of the present invention has the stopper, and the stopper is located on the outside in the radial direction of a pocket of the retainer, and prevent a roller that is held inside the pocket from falling out in the radial direction.

Effect of Invention

With the spring for a one-way clutch of the present invention, it is possible to suppress skewing of the locking members, and keep stress that occurs due to bending of the elastic pressure sections low. In other words, the spring for a one-way clutch of the present invention is such that the pair of elastic pressure sections cross each other in the middle section in the lengthwise direction thereof, so it becomes easy to maintain the space between the tip-end sections of the elastic pressure sections (distance between force points), and it is possible to make the overall length of the elastic pressure sections long. Therefore, when assembled in the one-way clutch, the tip-end sections of the elastic pressure sections are able to come in contacts the portions near both ends in the axial direction of the rolling surface of the locking member. Consequently, it is possible to effectively keep the locking member from becoming skewed. Moreover, it is possible to make the distance from the tip-end sections (force points) of the elastic pressure sections to the portions (fulcrums) where force acts on the elastic pressure sections large. Therefore, it is possible to keep the amount of bending of the elastic pressure sections small, and keep the stress that occurs in the elbow sections low.

MODES FOR CARRYING OUT INVENTION

FIRST EXAMPLE

FIG. 1 to FIG. 9 illustrate a first example of an embodiment of the present invention. A feature of this example is that by devising the construction of a pair of elastic pressure sections $23b1$, $23b2$ in each of the springs $11b$ of a roller clutch $5b$, the rollers 9 are prevented from becoming skewed, and stress that occurs due to bending of these elastic pressure sections $23b1$, $23b2$ is kept low. The other construction, functions and effects are the same as in the first example of conventional construction. Therefore, the same reference numbers are used for equivalent parts, and the explanation will center on the feature of this example.

Figure 1:
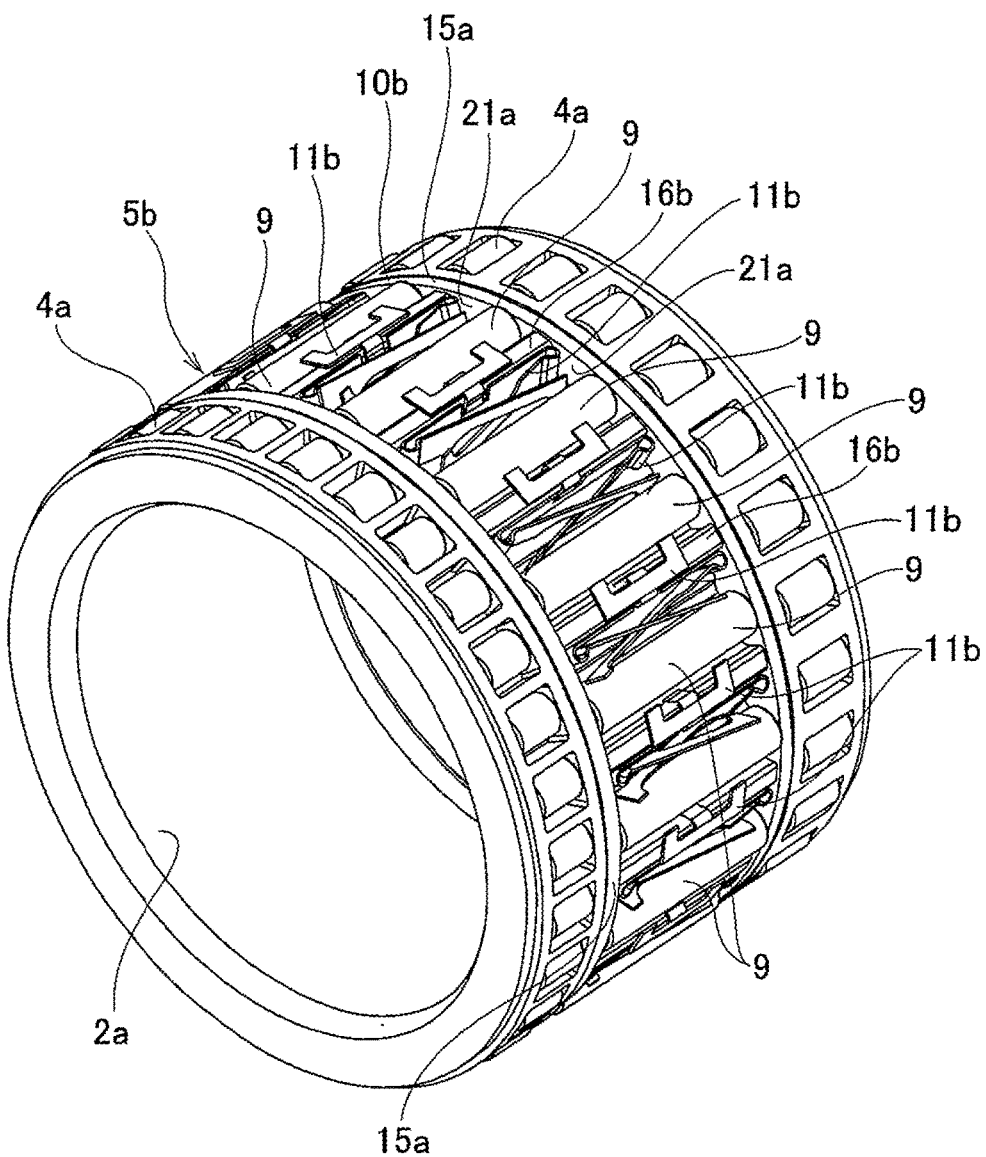
FIG. 1 is a perspective view of a roller clutch of a first example of an embodiment of the present invention, and illustrates a state in which the roller clutch fits over a sleeve together with a pair of support bearings.
Figure 2:
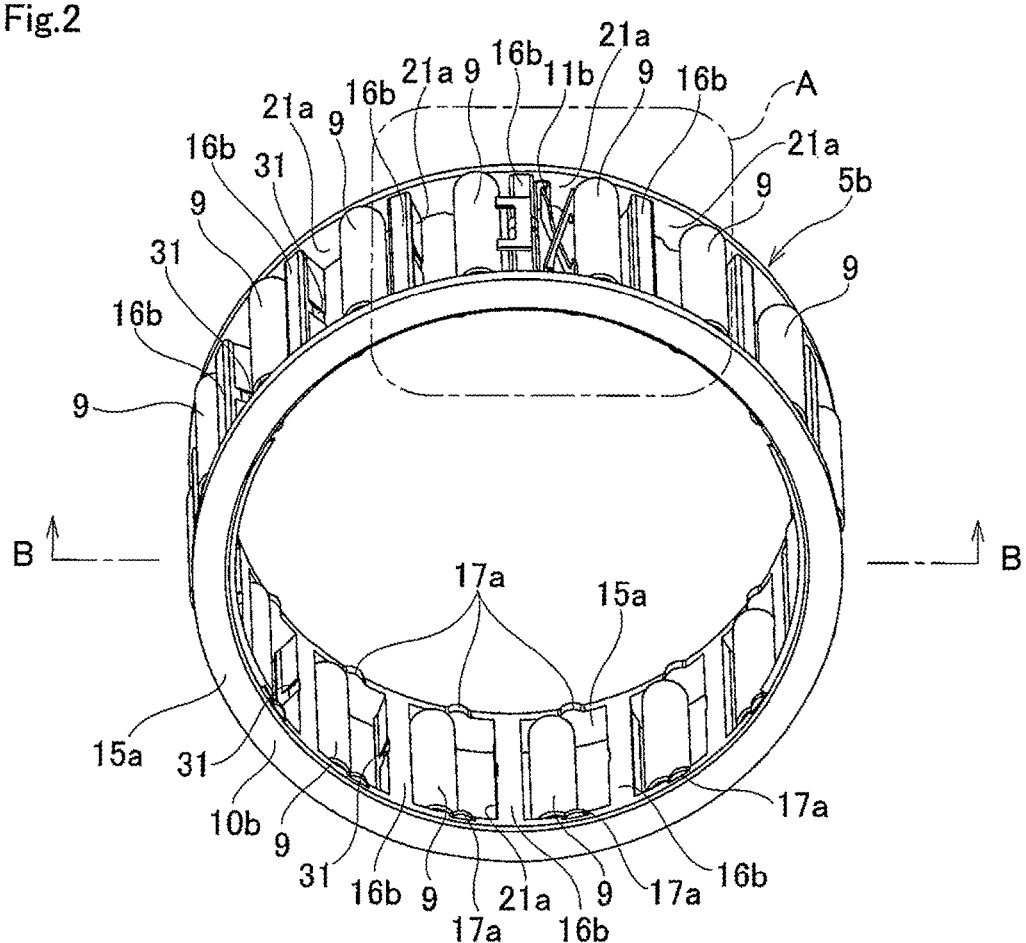
FIG. 2 is a perspective view illustrating a state in which the roller clutch of the first example has been removed, with one spring being left and the other springs being removed.
Figure 12:
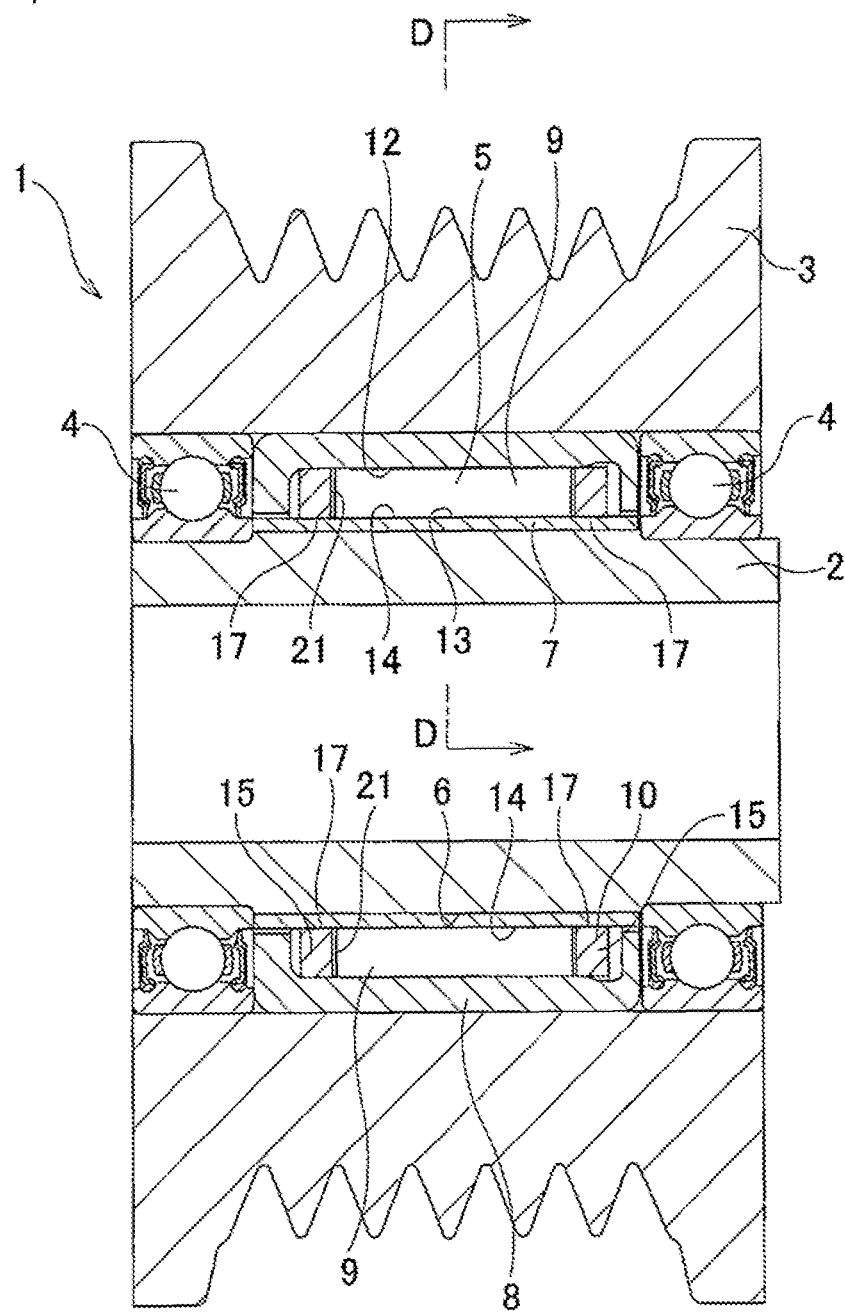
FIG. 12 is a cross-sectional view illustrating a pulley apparatus equipped with a roller clutch in which a first example of a roller clutch having conventional construction is assembled.
Figure 13:
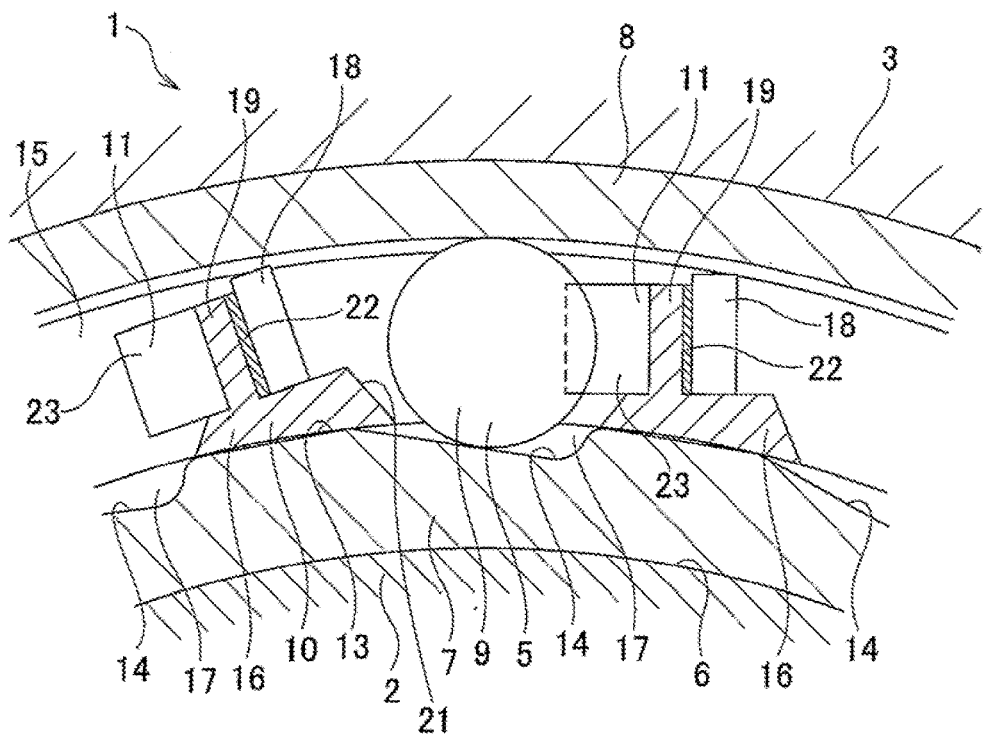
FIG. 13 is a cross-sectional view of section D-D in FIG. 12.
Figure 14:
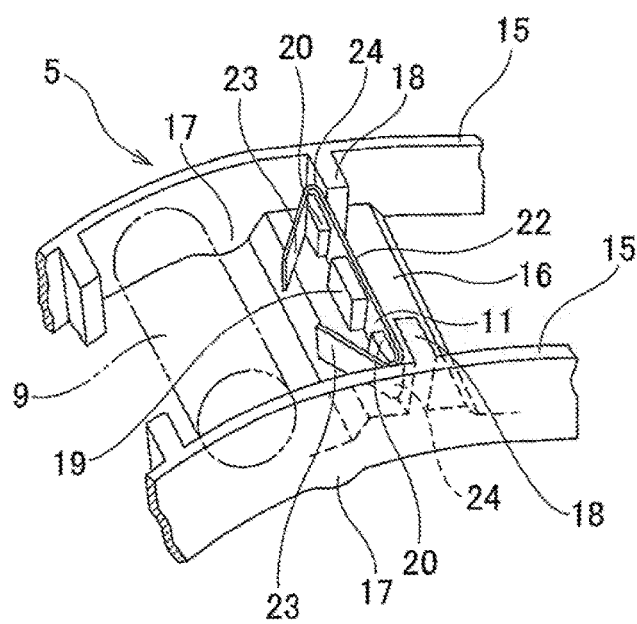
FIG. 14 is a partial cross-sectional perspective view illustrating a retainer and spring that have been removed from the first example of conventional construction.
Figure 15:
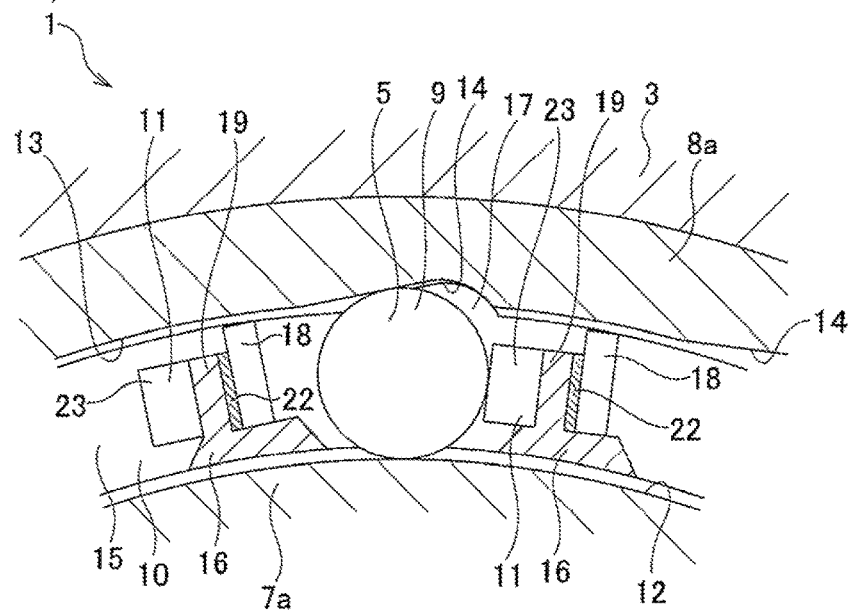
FIG. 15 is the same as FIG. 13 and illustrates a variation of a roller clutch that can be applied to the first example of conventional construction.

The roller clutch $5b$ of this example is assembled in a pulley apparatus for driving an auxiliary device for an automobile such as an alternator or starter motor, and as illustrated in FIG. 1, in the operating state, is arranged together with a pair of support bearings $4a$ that are cylindrical roller bearings between the outer-circumferential surface of a sleeve $2a$, which is fitted and fastened around the outside of a rotating shaft of an alternator or the like, and the inner-circumferential surface of a follower pulley 3 (see FIG. 12). The roller clutch $5b$ is able to transmit torque between the sleeve $2a$ and the follower pulley 3 only when there is a tendency for the follower pulley 3 to rotate in a specified direction relative to the sleeve $2a$.

The roller clutch $5b$ has: a clutch inner ring 7 (see FIG. 12) that is a member corresponding to an inner-ring; a clutch outer ring 8 that is a member corresponding to an outer ring, and is concentrically arranged around the clutch inner ring 7; plural rollers 9 that are locking members and that are arranged between the outer-circumferential surface of the clutch inner ring 7 and the inner-circumferential surface of the clutch outer ring 8; a retainer $10b$, and plural springs $11b$. The clutch inner ring 7 and clutch outer ring 8 are formed into an overall cylindrical shape using a plate material made of a hard metal such as bearing steel, or of a carburized steel such as SCM415. Moreover, plural concave sections 14 (see FIG. 12) called ramp sections are formed on the outer-circumferential surface of the clutch inner ring 7 and are uniformly spaced in the circumferential direction. On the other hand, of the inner-circumferential surface of the clutch outer ring 8, at least the middle section in the axial direction that comes in contact with the rollers 9 is a cylindrical surface 12 (see FIG. 12). The cylindrical surface 12 and cam surface 13 that come in contact with the rollers 9 may be formed directly on the inner circumferential surface of the follower pulley 3 and the outer-circumferential surface of the sleeve $2a$. In that case, the sleeve $2a$ corresponds to a member corresponding to an inner ring, and the follower pulley 3 corresponds to a member corresponding to an outer ring. Moreover, this example can also be applied to construction in which the arrangement in the radial direction of the cylindrical surface 12 and the cam surface 13 is opposite from that of the construction illustrated in the figures. Furthermore, this example can also be applied to cases in which an engaging elements such as sprags or cams are used as the locking member instead of the rollers 9.

The retainer $10b$ is integrally formed into a cage-like cylindrical shape by a synthetic resin such as a polyamide 46, and has: a pair of ring-shaped rim sections $15a$, column sections $16b$ that connect the inside surfaces of the rim sections 15a together, and plural pockets 21a that are formed in portions that are surrounded on four sides by the inside surfaces of the pair of rim sections 15a and the side surfaces in the circumferential direction of a set of two column sections 16b that are adjacent in the circumferential direction and that are for holding the rollers 9 so as to be able to freely roll and move a little in the circumferential direction. By causing plural protruding pieces 17a that are formed on the inner circumferential surface of the rim sections 15a to engage with plural concave sections 14 that are formed on the outer circumferential surface of the roller clutch inner ring 7, relative rotation with respect to the roller clutch inner ring 7 becomes impossible.

Figure 3:
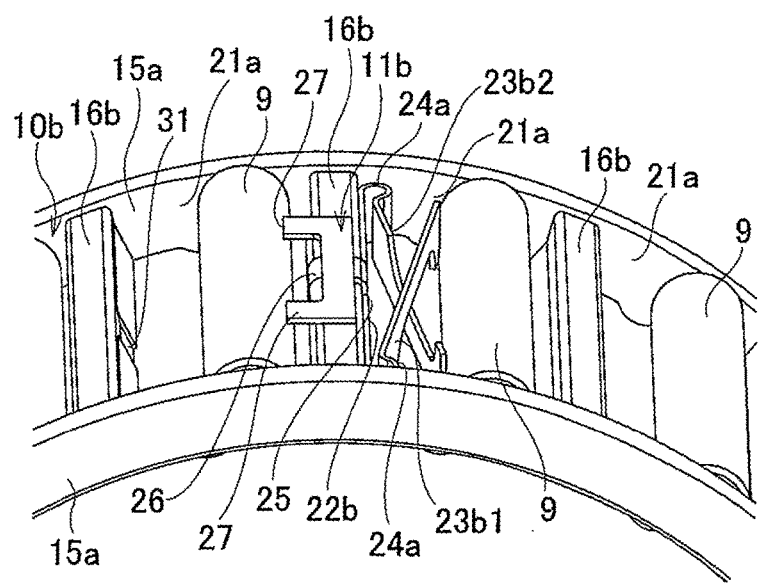
FIG. 3 is an enlarged view of part A in FIG. 2.
Figure 4:
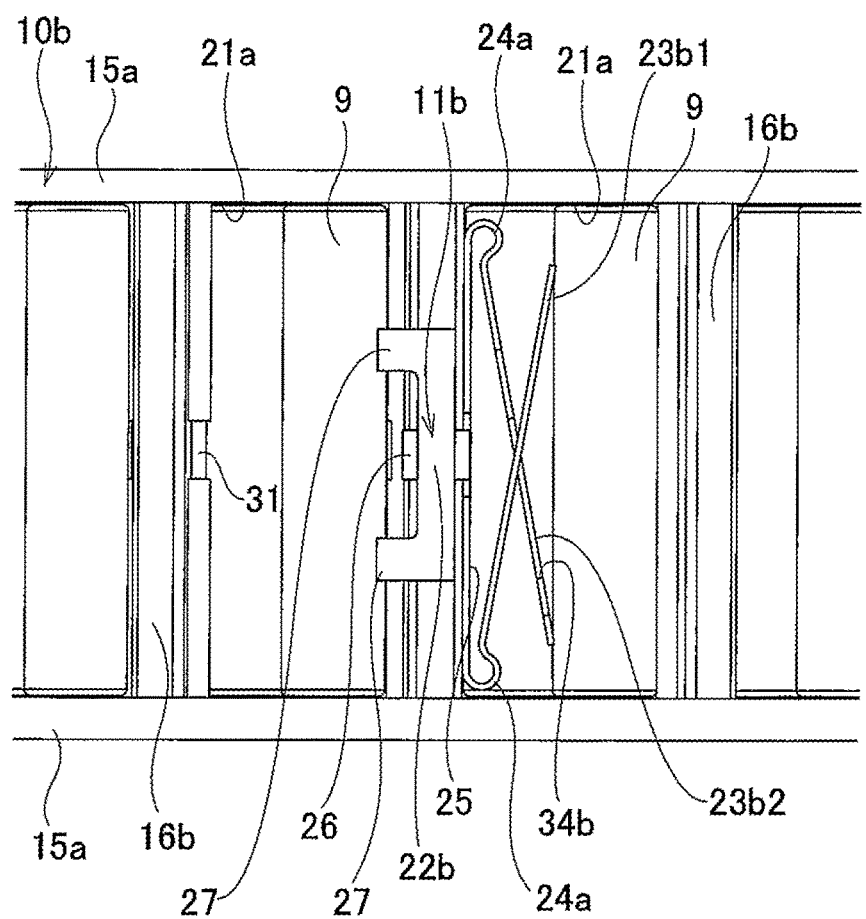
FIG. 4 is a top view as seen from above in FIG. 3.
Figure 5:
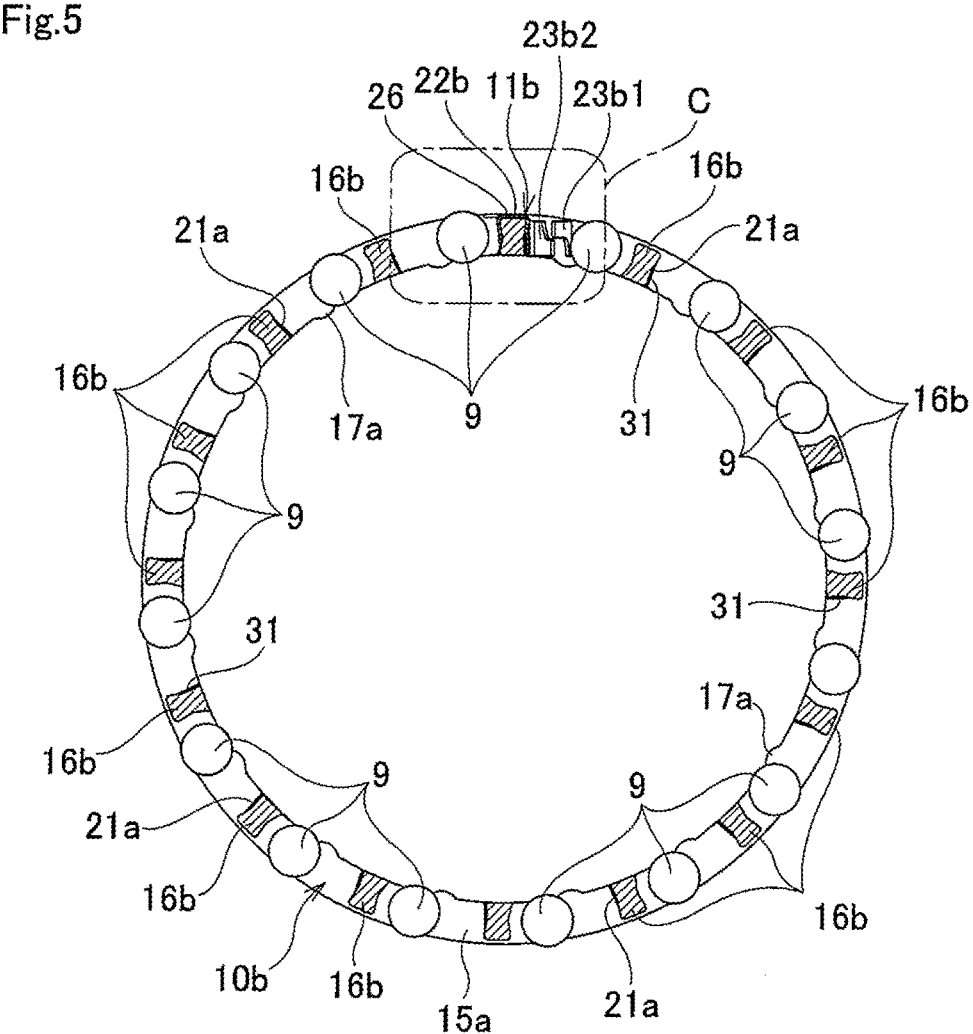
FIG. 5 is a cross-sectional view of section B-B in FIG. 2.
Figure 6:
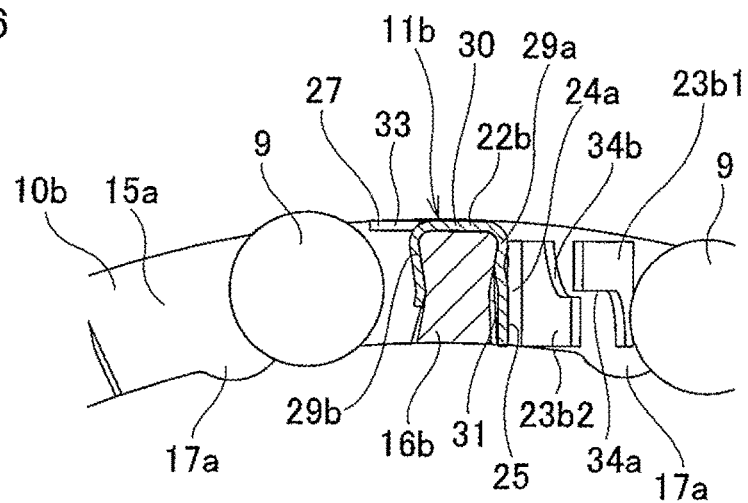
FIG. 6 is an enlarged view of part C in FIG. 5.
Figure 7:
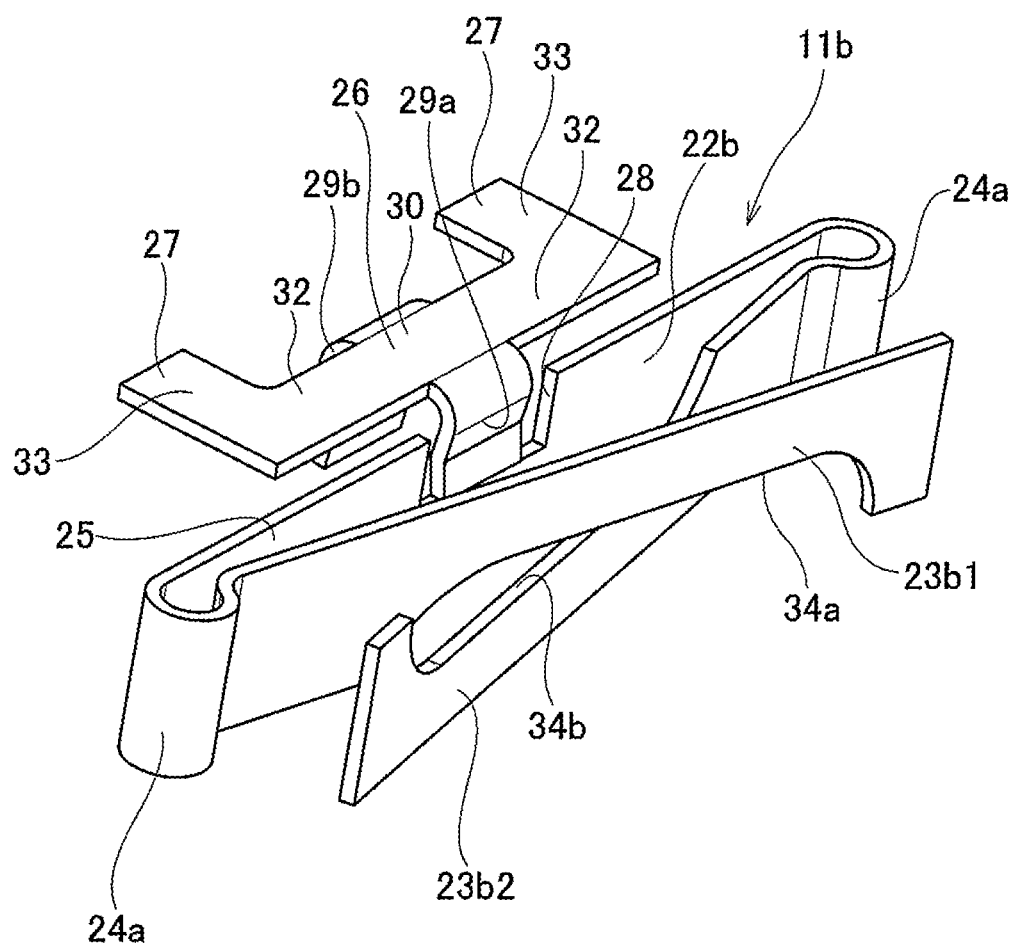
FIG. 7 is a perspective view of a spring that has been removed from the roller clutch of the first example.
Figure 8:
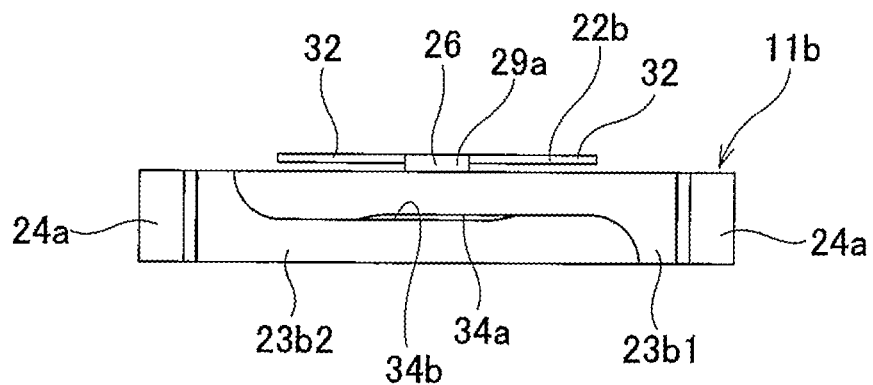
FIG. 8A is a front view illustrating a spring that has been removed from the roller clutch of the first example.
FIG. 8B is a top view of the spring.
FIG. 8C is a rear view of the spring.
Figure 8:
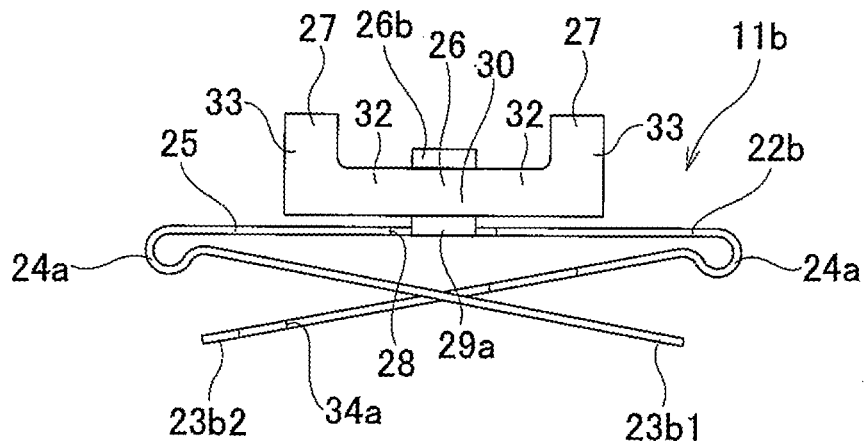
Figure 8:
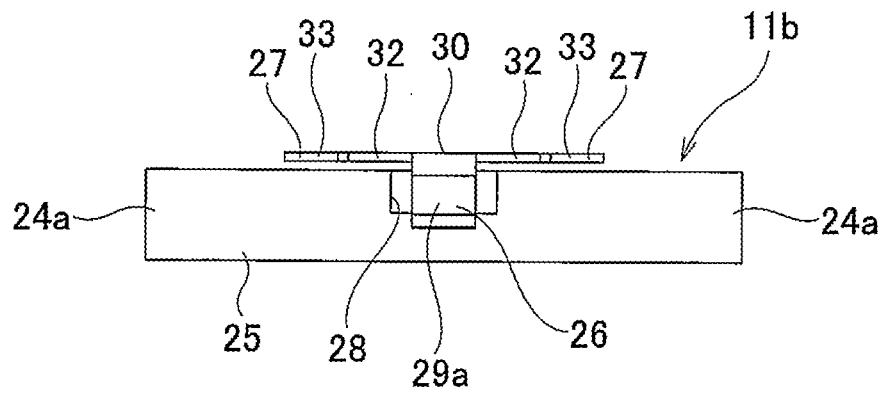
Figure 9:
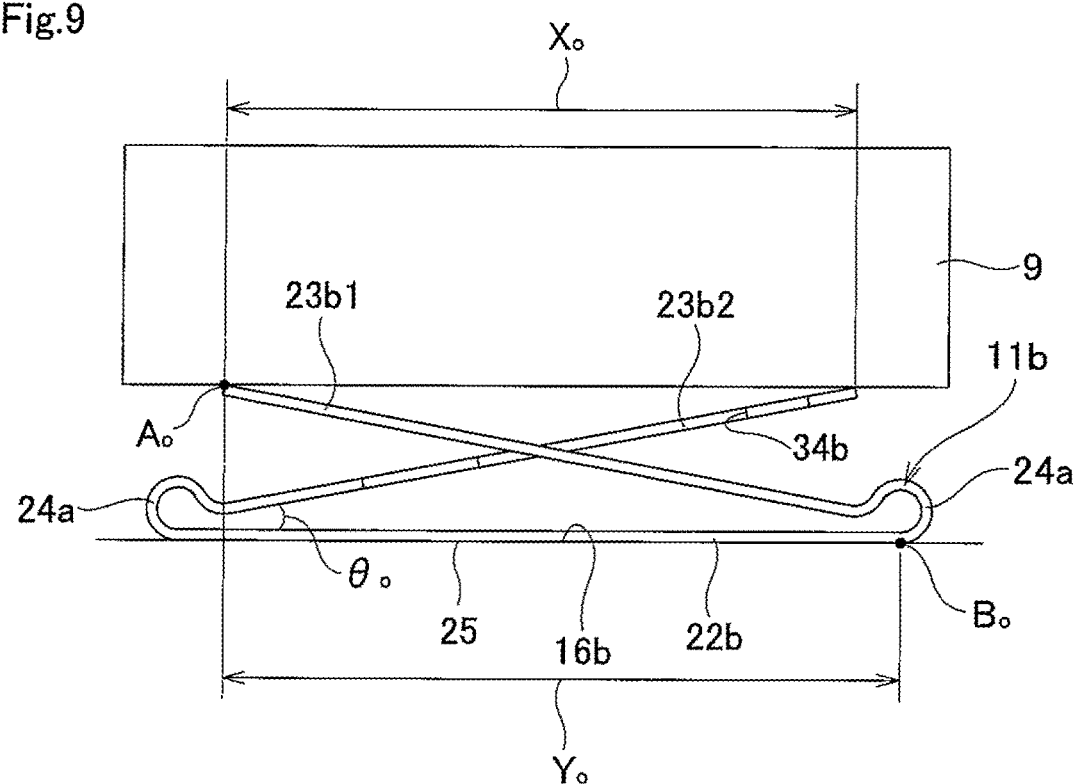
FIG. 9 is a schematic view illustrating the roller clutch of the first example, and is for explaining the distance X between force points, and the distance Y between a force point and fulcrum.

In this example, the springs (one-way clutch springs) 11b are respectively provided between adjacent column sections 16b of the retainer 10b and the rollers 9, and elastically press the rollers 9 in the same direction in the circumferential direction (forward direction; right direction in FIG. 3, FIG. 4 and FIG. 6, and top direction in FIG. 9). Particularly, in this example, each of the springs 11b is formed by performing a bending process on a stainless steel plate (elastic metal plate) such as SUS304 having a thickness of 0.1 mm to 0.3 mm and has a base section 22b, a pair of elastic pressure sections 23b1, 23b2, and a pair of elbow sections 24a.

The base section 22b comprises a function of securing the spring 11b to the retainer 10b, and has a base-plate section 25, a holding section 26, and a pair of stoppers 27. The base-plate section 25 has a flat shape, and when mounted in the retainer 10b, the surface on the rear side thereof (left side surface in FIG. 3, FIG. 4 and FIG. 6, bottom surface in FIG. 9) elastically comes in contact with the surface on the front side in the circumferential direction of the column section 16b (right side surface in FIG. 3, FIG. 4 and FIG. 6, top surface in FIG. 9). Moreover, a rectangular notch 28 is formed in one half in the width direction of the middle section in the lengthwise direction of the base-plate section 25 (outer half in the radial direction when mounted in the retainer 10b).

The holding section 26 of the base section 22b has a U shape that is open on the other side in the width direction (bottom side in FIG. 3, FIG. 4, FIG. 6 and FIG. 7) of the base-plate section 25, and is provided in the portion of the base section 22b on the other side in the thickness direction of the base-plate section 25 (left side portion in FIG. 3, FIG. 4 and FIG. 6, and bottom side portion in FIG. 9) so as to be continuous with the middle section in the lengthwise direction of the base-plate section 25. More specifically, the holding section 26 has a pair of clamp sections 29a, 29b that are parallel with the base-plate section 25 and are separated from each other in the thickness direction of the base-plate section 25, and a cover section 30 that connects the edges of one of the ends of the these clamp sections 29a, 29b (edges of the outside ends in the radial direction when mounted in the retainer 10b), and the edge on the other end of one of the clamp sections 29a (edge of the inside end in the radial direction when mounted in the retainer 10b) is connected to the bottom section of the notch 28. When mounted in the retainer 10b and the space between the clamp sections 29a, 29b is elastically expanded, the holding section 26 engages with the middle sections of the column section 16b from the outside in the radial direction. As a result, the cover section 30 covers the outer-circumferential surface of the column sections 16b, and the clamp sections 29a, 29b elastically clamp onto the column section 16b from both sides in the circumferential direction. Moreover, in this state, the clamp section 29a engages with a locking groove 31 that is formed in the side surface in the circumferential direction of the column sections 16b. Clamp section 29a of the holding section 26 can also be substituted for part of the base-plate section 25.

The pair of stoppers 27 of the holding section 26 are provided on the cover section 30, which is part of the holding section 26, so as to extend toward the other side in the thickness direction of the base-plate section 25. More specifically, the stoppers 27 are each L shaped, and have a pair of base-half sections 32 that protrude out in the lengthwise direction of the base-plate section 25 from the cover 30, and a pair of tip-half sections 33 that are bent at a right angle toward the other side in the thickness direction of the base-plate section 25 from the tip-end sections of the base-half sections 32. When mounted in the retainer 10b, the tip-half sections 33 of the stoppers 27 are located on the outside in the radial direction of the pocket 21a, and prevent the roller 9 that is held inside the pocket 21a from coming out in the radial direction.

Figure 16:
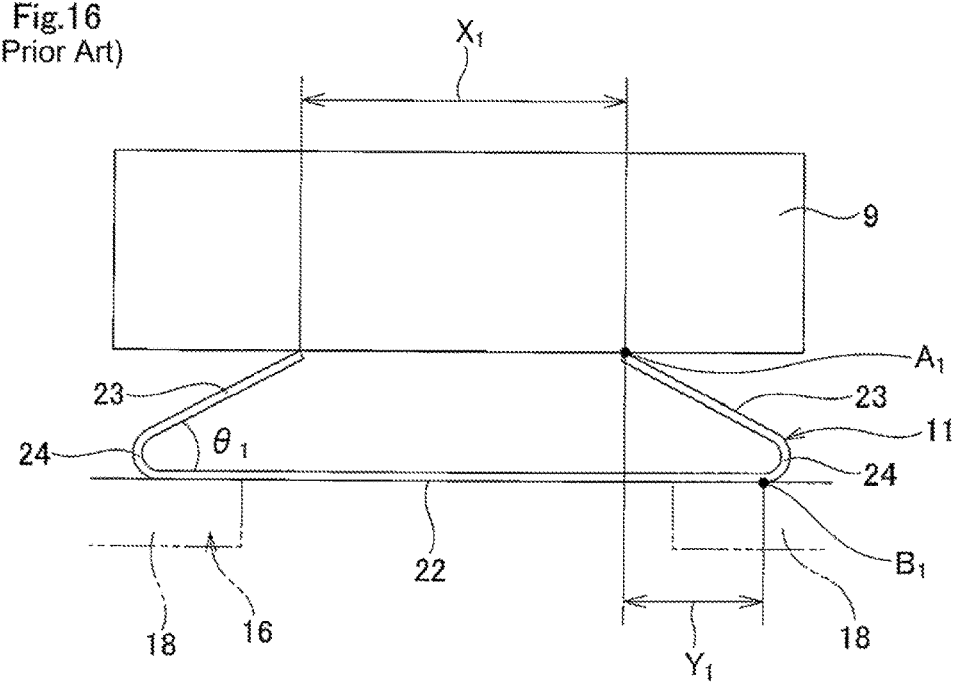
FIG. 16 is a schematic view illustrating the roller clutch of the first example of conventional construction, and is for explaining the distance X between force points, and the distance Y between a force point and fulcrum.
Figure 17:
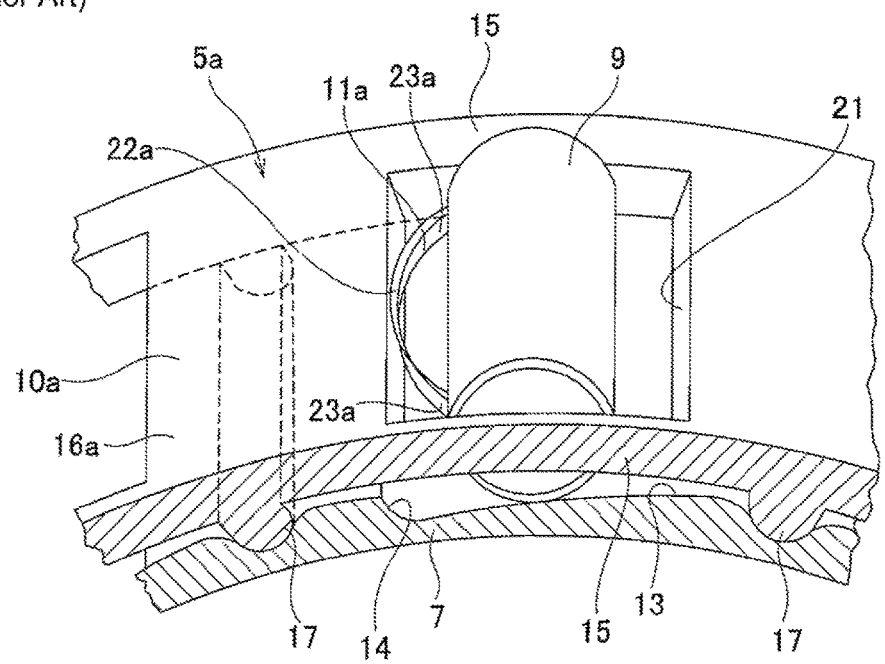
FIG. 17 is a partial cross-sectional perspective view illustrating a second example of a roller clutch having conventional construction.
Figure 18:
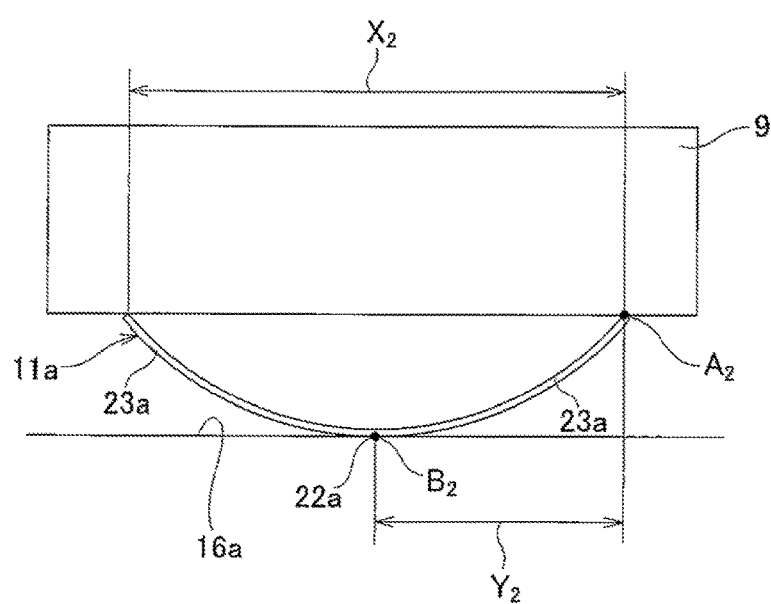
FIG. 18 corresponds to FIG. 16 for the second example of conventional construction.

The elastic pressure sections 23b1, 23b2 are straight over the entire length, and are formed by bending portions on both sides in the length direction of the base-plate section 25 at an acute angle ($\theta_0$) toward one side in the thickness direction of the base-plate section 25 (right side in FIG. 3, FIG. 4 and FIG. 6, and top side in FIG. 9). Particularly, in this example, the elastic pressure sections 23b1, 23b2 cross each other in the middle sections in the lengthwise direction thereof (center sections in the lengthwise direction in the free state). Therefore, in this example, the entire length of the elastic pressure sections 23b1, 23b2 is the same as the entire length of the base-plate section 25, or a little shorter than the entire length of the base-plate section 25 (⅘ to 1 times the entire length of the base plate section 25), and are sufficiently longer (about 3 times longer) than the entire length of the elastic pressure sections 23 (see FIG. 16) in the first example of conventional construction. Moreover, the inclination angle ($\theta_0$) in the free state of the elastic pressure section 23b1, 23b2 with respect to the base-plate section 25 is sufficiently smaller than in the first example of conventional construction ($\theta_0 < \theta_1$). In addition to being straight, it is also possible to employ an overall arc shape for the shape of the elastic pressure sections 23b1, 23b2.

Furthermore, together with making it possible for the elastic pressure sections 23b1, 23b2 to cross each other, in order to allow bending deformation of the elastic pressure sections 23b1, 23b2 even when the elastic pressure sections 23b1, 23b2 are crossed, concave through-hole sections 34a, 34b are formed in the middle sections in the lengthwise direction of the elastic pressure sections 23b1, 23b2. More specifically, a rectangular concave through-hole section 34a is formed in the middle section in the lengthwise direction of one elastic pressure section 23b1 that is located on the same side as the cover section 30 in the width direction of the base-plate sections 25 (outside in the radial direction when mounted in the retainer 10b) in the crossing section of the elastic pressure sections 23b1, 23b2, in which the side of the one elastic pressure section 23b1 that faces the other elastic pressure section 23b2 is recessed. On the other hand, a rectangular concave through-hole section 34b is formed in the middle section in the lengthwise direction of the other elastic pressure section 23b2 that is located on the opposite side from the cover section 30 in the width direction of the base-plate sections 25 (inside in the radial direction when mounted in the retainer 10b) in the crossing section, in which the side of the other elastic pressure section 23b2 that faces the one elastic pressure section 23ba is recessed. The middle section in the lengthwise direction of the other elastic pressure section 23b2 (remaining section of the portion where the concave through-hole section 34b is formed) is arranged inside the though-hole concave section 34a that is formed in the one elastic pressure section 23b1, and the middle section in the lengthwise direction of the one elastic pressure section 23b1 (remaining section of the portion where the concave through-hole section 34a is formed) is arranged inside the concave through-hole section 34b that is formed in the other elastic pressure section 23b. In this example, by using this kind of construction, the elastic pressure sections 23b1, 23b2 can cross each other in the middle sections in the lengthwise direction thereof, and are able to bend and deform within the range where the concave through-hole sections 34b, 34a are formed.

Furthermore, the pair of elbow sections 24a comprise a function of allowing the elastic pressure sections 23b1, 23b2 to elastically bend with respect to the base-plate section 25, and having a partial (¾) cylindrical shape, and are provided in the connecting section between the base-end sections of the elastic pressure sections 23b1, 23b2, and both end sections in the lengthwise direction of the base-plate section 25.

By securing the holding sections 26 of the base sections 22b to the middle sections of the column sections 16b from the outside in the radial direction, the springs 11b are secured at plural locations in the circumferential direction of the retainer 10b. With the springs 11b secured to the retainer 10b. the tip-end sections of the elastic pressure sections 23b1, 23b2 come in elastic contact with the rolling surfaces of the rollers 9. In doing so, the elastic pressure sections 23b1, 23b2 elastically press the rollers 9 forward in the circumferential direction toward the portion in the cylindrical space between the cylindrical surface 12 and cam surface 13 where the width in the radial direction is narrow. As a result, during operation, it becomes possible to quickly switch between the locked state and the overrun state of the roller clutch 5b. Moreover, in this example, the stoppers 27 prevent the separate rollers 9 that are located on the opposite side in the circumferential direction from the rollers 9 that are pressed by the respective elastic pressure sections 23b1, 23b2 across the spring 11b (column section 16b) from coming out. However, omitting the holding section 26 and the stoppers 27 from the construction of this example, and assembling a spring that has a base section 22 consisting of only a base-plate section as in the first example of conventional construction in the retainer 10 of the first example of conventional construction is also within the scope of the present invention.

With the construction of this example, it is possible to keep the rollers 9 from becoming skewed, as well as suppress stress that occurs in the springs 11b (elbow sections 24a) due to bending of the elastic pressure sections 23b1, 23b2. In other words, in this example, the distance $X_0$ between force points, which is the distance between the tip-end sections of the elastic pressure sections 23b1, 23b2, is made to be sufficiently larger than in the first example of conventional construction ($X_0 > X_1$) by having the elastic pressure sections 23b1, 23b2 cross each other in the middle sections in the lengthwise direction thereof. Moreover, the overall length of the elastic pressure sections 23b1, 23b2 is sufficiently long. Therefore, when the springs 11b are assembled in the roller clutch 5b, the tip-end sections (tip-end edge sections) of the elastic pressure sections 23b1, 23b2 come in contact with portions near both ends in the axial direction of the rolling surfaces of the rollers 9. Consequently, the rollers 9 are effectively prevented from becoming skewed.

In this example, the distance $Y_0$ from the force points $A_0$, which are the tip-end sections of the elastic pressure sections 23b1, 23b2 to the fulcrums $B_0$, which are the portions the support the force acting from the roller 9, (areas of contact between one side surface in the circumferential direction of the column 16b and both end sections in the lengthwise direction of the base-plate section 25) can be made to be sufficiently large when compared with the first example and second example of conventional construction ($Y_0 > Y_2 > Y_1$). Therefore, it is possible to keep the amount of bending of the elastic pressure sections 23b1, 23b2 small, and keep the stress that occurs in the elbow sections 24a low.

Furthermore, in this example, the column sections 16b, 16b are elastically held by the holding sections 26 of the base plates 22b (pair of clamp sections 29a, 29b), so the springs 11b are effectively prevented from falling out from the retainer 10b. In addition, the stoppers 27 also prevent the rollers 9 from falling out, so it is possible to improve the work efficiency when assembling the one-way clutch 5b.

SECOND EXAMPLE

Figure 10:
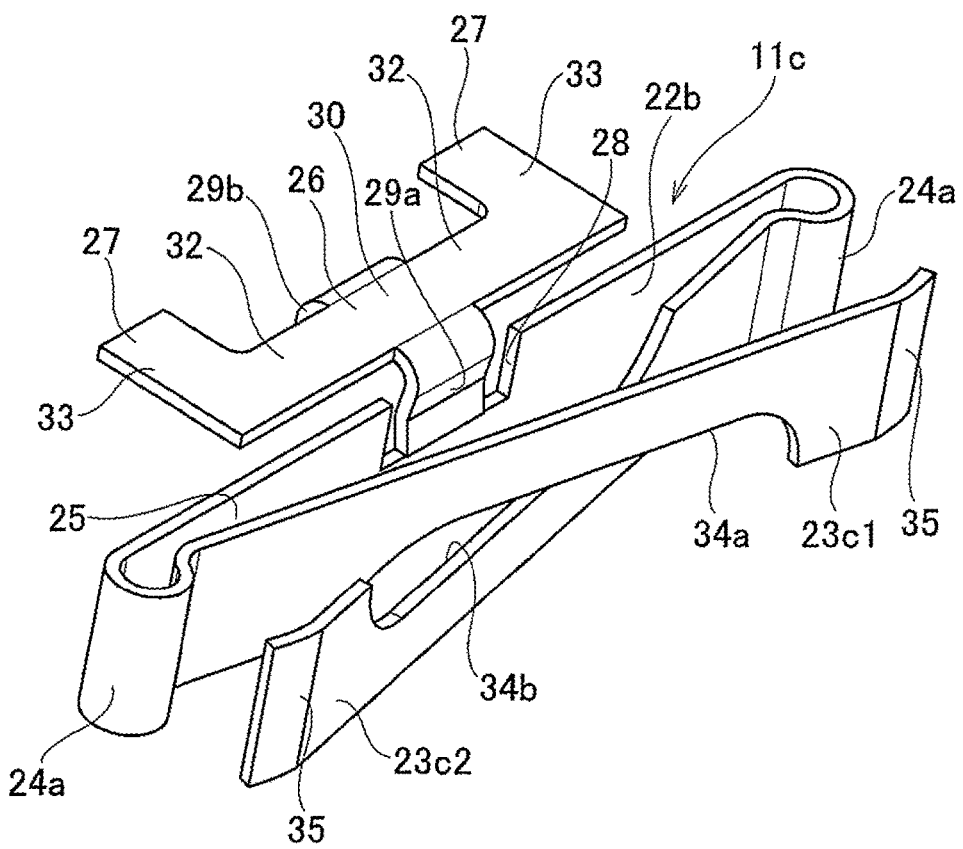
FIG. 10 is the same as FIG. 7 for a second example of an embodiment of the present invention.
Figure 11:
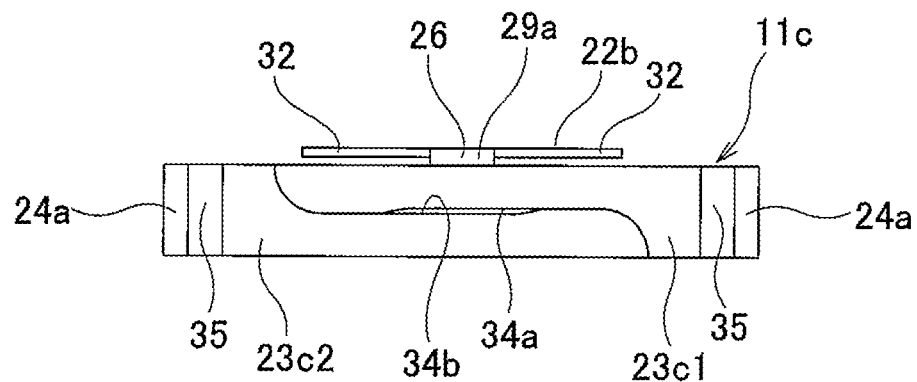
FIG. 11A to FIG. 11C are the same FIG. 8A to FIG. 8C for the second example.
Figure 11:
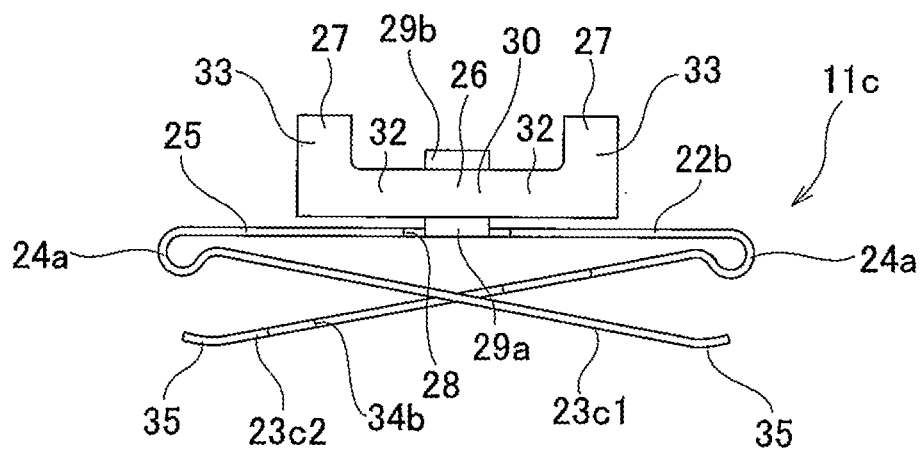
Figure 11:
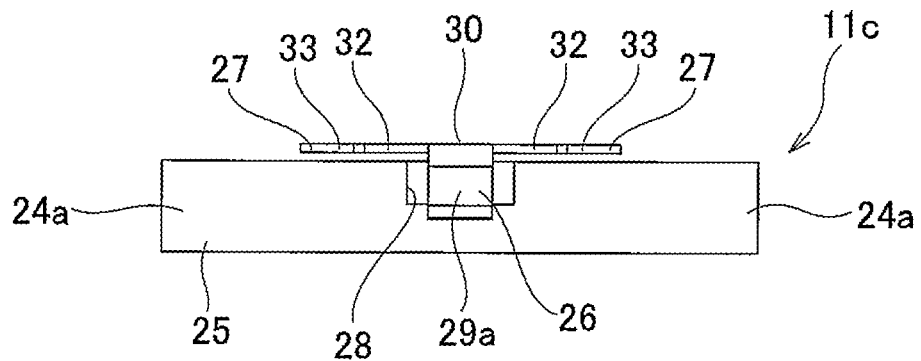

FIG. 10 and FIG. 11 illustrate a second example of an embodiment of the present invention. In this example, convex pressure sections 35 are formed on the tip-end sections of the pair of elastic pressure sections 23c1, 23c2 of the spring 11c so that the surface of each of the convex pressure sections 35 that is located on the opposite side from the surface facing the base-plate section 25, and that faces the roller 9, is curved in a circular arc shape to form a convex surface. In this example, together with being able to reduce the wear of the convex pressure sections 35, it is also possible to prevent damage such as scratching of the rolling surface of the roller 9 that comes in contact with the convex pressure sections 35. In addition to a circular arc shape as described above as the form of deforming the tip-end sections of the elastic pressure sections, it is possible to adopt various shapes such as bending the tip-end section into an obtuse angle so that a flat surface section on the tip-end section comes in contact with the rolling surface of the roller 9. The other construction, functions and effects are the same as in the first example of an embodiment.

INDUSTRIAL APPLICABILITY

The one-way clutch of the present invention, in addition to a pulley apparatus for rotating and driving an auxiliary machine such as an alternator of an automobile, or a mechanism that switches the driving force in an oil pump, can be applied to the rotation transmission portion of various kinds of machinery such as a paper feeding mechanism for a fax machine or copier.

EXPLANATION OF REFERENCE NUMBERS

1 Pulley apparatus equipped with a roller clutch
2, 2a Sleeve
3 Follower pulley
4, 4a Support bearing
5, 5a, 5b Roller clutch
6 Large-diameter section
7, 7a Clutch inner ring
8, 8a Clutch outer ring
9 Roller
10, 10a, 10b Retainer
11, 11a, 11b Spring
12 Cylindrical surface 13 Cam surface
14 Concave section
15, 15a Rim section
16, 16a, 16b Column section
17, 17a Protruding piece
18 Rear support plate section
19 Front support plate section
20 Protruding section
21, 21a Pocket
22, 22a, 22b Base section
23, 23a, 23b1, 23b2, 23c1, 23c2 Elastic pressure section
24, 24a Elbow section
25 Base-plate section
26 Holding section
27 Stopper
28 Notch
29a, 29b Clamp section
30 Cover section
31 Locking groove
32 Base half section
33 Tip half section
34a, 34b Concave through-hole section
35 Convex pressure section

What is claimed is:

1. A spring for a one-way clutch, comprising:
a base section having a flat shaped base-plate section that is made of a metal sheet having elasticity;
a pair of elastic pressure sections formed by bending portions on both sides in a lengthwise direction of the base-plate section at an acute angle to one side in a thickness direction of the base-plate section, with each having a tip-end section; and
a pair of elbow sections provided in continuous sections between the pair of elastic pressure sections and the base-plate section and having a partially cylindrical shape;
wherein concave through-hole sections having a rectangular shape are formed in middle sections in the lengthwise direction of the elastic pressure sections such that the sides of the elastic pressure sections facing each other are recessed, and the pair of elastic pressure sections cross each other in the middle sections in the lengthwise direction thereof such that portions of the middle sections of each of the elastic pressure sections are arranged inside the concave through-hole section of the other of the elastic pressure sections.

2. The spring for a one-way clutch according to claim 1, wherein each of the tip-end sections of the pair of elastic pressure sections is bent so that a surface that is on an opposite side from a surface that faces the base-plate section is a convex surface.

3. The spring for a one-way clutch according to claim 1, wherein a U-shaped holding section is provided in a portion of the base section on another side in the thickness direction of the base-plate section so as to be continuous with a middle section in the lengthwise direction of the base-plate section.

4. The spring for a one-way clutch according to claim 3, wherein a stopper extending toward the other side in the thickness direction of the base-plate section is provided on part of the holding section.

5. The one-way clutch, comprising:
a member corresponding to an inner ring;
a member corresponding to an outer ring that is arranged around the member corresponding to the inner ring, and is concentric with the member corresponding to the inner ring;
plural locking members provided between an outer-circumferential surface of the member corresponding to the inner ring, and an inner-circumferential surface of the member corresponding to the outer ring;
a retainer holding the locking members; and
springs secured to the retainer and pressing the locking members in a direction so as to engage with both the outer-circumferential surface of the member corresponding to the inner ring, and the inner-circumferential surface of the member corresponding to the outer ring;
wherein the locking members engage with the outer-circumferential surface of the member corresponding to the inner ring, and the inner-circumferential surface of the member corresponding to the outer ring so as to transmit torque therebetween only when there is a tendency for relative rotation in a specified direction between the member corresponding to the inner ring and the member corresponding to the outer ring, and
each of the springs is constructed by the spring for the one-way clutch according to claim 1.

* * * * *